(12) United States Patent
Jackson

(10) Patent No.: US 6,513,841 B1
(45) Date of Patent: Feb. 4, 2003

(54) BLOWOUT LATCH

(75) Inventor: Frank T. Jackson, Lake Elsinore, CA (US)

(73) Assignee: Hartwell Corporation, Placentia, CA (US)

( * ) Notice: Subject to any disclaimer, the term of this patent is extended or adjusted under 35 U.S.C. 154(b) by 8 days.

(21) Appl. No.: 09/685,482

(22) Filed: Oct. 10, 2000

(51) Int. Cl.[7] .............................. E05C 3/06; E05C 3/16
(52) U.S. Cl. ................... 292/214; 292/197; 292/126; 292/226; 292/252; 292/79
(58) Field of Search ..................... 292/92, 240, 93, 292/DIG. 4, DIG. 61, 197, 126, 226, 100, 200, 252, 79

(56) References Cited

U.S. PATENT DOCUMENTS

| | | | | |
|---|---|---|---|---|
| 2,655,395 A | * | 10/1953 | Groeger | 292/92 |
| 3,149,867 A | * | 9/1964 | Odend'hal | 292/226 |
| 3,201,960 A | * | 8/1965 | Berkowitz | 70/150 |
| 3,571,977 A | | 3/1971 | Abeel | 49/379 |
| 3,652,113 A | * | 3/1972 | Odend'hal et al. | 292/216 |
| 3,758,140 A | * | 9/1973 | Prete, Jr. | 292/223 |
| 4,230,352 A | * | 10/1980 | Sealey et al. | 292/341.17 |
| 4,365,831 A | | 12/1982 | Bourne | 292/229 |
| 4,709,950 A | * | 12/1987 | Zortman | 292/92 |
| 5,620,213 A | | 4/1997 | Ellis | 292/210 |
| 5,638,709 A | | 6/1997 | Clavin | 70/208 |
| 5,765,883 A | | 6/1998 | Dessenberger et al. | 292/92 |
| 5,765,993 A | | 6/1998 | Dessenberger et al. | 292/92 |
| 5,984,381 A | * | 11/1999 | Yamagishi | 292/45 |
| 6,009,732 A | * | 1/2000 | Haeck et al. | 70/92 |
| 6,203,076 B1 | * | 3/2001 | Wytcherley et al. | 292/202 |

FOREIGN PATENT DOCUMENTS

| | | |
|---|---|---|
| EP | 0306223 | 3/1989 |
| EP | 01 30 8636 | 2/2002 |
| FR | 2605671 | 4/1988 |

* cited by examiner

Primary Examiner—Anthony Knight
Assistant Examiner—John B. Walsh
(74) Attorney, Agent, or Firm—Barnes & Thornburg

(57) ABSTRACT

Disclosed is a blowout latch for releasably securing an aircraft panel to an aircraft structure. The blowout latch includes a housing, a bolt, and a handle. The housing includes a bias section that has a plate, a block adjacent the plate, at least one coil spring having opposing ends, a roller mount, and a roller pin. The roller mount has a roller mount base. One end of the coil spring contacts the roller mount base. The opposing end of the coil spring contacts the block. The roller pin is rotatably mounted to the roller mount. The bolt is rotatably mounted to the housing and is used to engage the aircraft structure. The bolt has a secured position. The bolt is held in its secured position by the coil spring which biases the roller pin against the bolt. The handle is rotatably mounted to the bolt and is moveable between a latched position and an unlatched position, without the use of a tool. The handle provides an indicator when the blowout latch is in an open position.

22 Claims, 6 Drawing Sheets

BLOWOUT LATCH

BACKGROUND OF THE INVENTION

1. Field of the Invention

This invention relates to the mechanical arts. In particular, this invention relates to a blowout latch for securing an aircraft panel to an aircraft structure.

2. Discussion of the Related Art

A blowout latch automatically opens when the pressure inside of a panel, to which the blowout latch is mounted, exceeds a predetermined amount. Modern aircraft employ many types of latches, including blowout latches, to secure aircraft panels to adjacent aircraft structures. For example, blowout latches are used to secure the panels enclosing the aircraft's engine. When used in such an environment, the blowout latch opens and relieves pressure that builds up inside of the panels due to the jet exhaust stream flowing through the jet engine. The opening ofthe blowout latch allows the panels to pivot open thus preventing any damage due to excessive loads on the panels and other structural components.

One such blowout latch is disclosed in U.S. Pat. No. 5,765,883. The latch includes a bolt that is pivotally mounted to a housing connected to the aircraft panel. The bolt has a slot into which a screwdriver is inserted for manually releasing the latch. Another blowout latch, disclosed in U.S. Pat. No. 3,571,977, also requires a screw driver or other tool be inserted into a slot in the bolt in order to manually open the latch. Accordingly, these latches disadvantageously require a separate tool for manual opening required for routine maintenance and inspection.

Another characteristic of both latches is that when the latch is open, the portion of the bolt that extends above the surface of the housing is small. Thus, the bolt cannot be used as an immediately visible indicator that the latch is open. Therefore, observers from the ground may not be alerted that the latch is open and not properly closed and secured. Therefore, a further disadvantage of the latches is that they do not provide an immediately visible indicator that the latch is open. These latches and other conventional blowout latches have the added disadvantage of being large and heavy, weighing five pounds or more.

In view of the above, it should be appreciated that there is a need for a blowout latch that does not require a separate tool for opening the latch, that is easy to open for maintenance and inspection, that provides an indicator visible from the ground when the blowout latch is not closed and secured, and that is compact and lightweight.

SUMMARY OF THE INVENTION

The invention resides in a blowout latch that provides advantages over known latches in that the blowout latch does not require a separate tool for opening. Also, the blowout latch is easy to open for maintenance and inspection. Furthermore, the blowout latch provides an indicator that is visible from the ground when the blowout latch is not closed and secured. In addition, the blowout latch is compact and lightweight.

The blowout latch is used to releasably secure an aircraft panel to an aircraft structure. The blowout latch includes a housing, a bolt, and a handle. The housing includes a bias section that has a plate, a block, at least one coil spring having opposing ends, a roller mount, and a roller pin. The block is positioned adjacent to the plate. The roller mount has a roller mount base. One end of the coil spring contacts the roller mount base. The opposing end of the coil spring contacts the block. The roller pin is rotatably mounted to the roller mount. The bolt is rotatably mounted to the housing and engages the aircraft structure. The bolt has a secured position. The bolt is held in its secured position by the coil spring biasing the roller pin against the bolt. The handle is rotatably mounted to the bolt and is moveable between a latched position and an unlatched position, without the use of a tool. The handle provides an indicator when the blowout latch is in an open position. In other embodiments of the present invention, the bolt includes a detent notch.

Other embodiments of the present invention include a handle spring which interfaces with the handle and bolt. The handle spring urges the handle toward the unlatched position. Further embodiments of the present invention include; a trigger lock that is pivotally mounted to the handle and secures the handle to the bolt, and a handle with a handle base plate and a trigger spring. The trigger spring interfaces with the trigger lock and the handle and urges the trigger lock toward a flush position relative to the handle base plate. In another embodiment of the present invention, the housing includes a faceplate having recessed channel. The recessed channel receives the handle when the handle is in its latched position.

Another embodiment of the present invention includes an adjustment screw that is threadably mounted through the plate. The adjustment screw is used to vary the length of the coil spring by adjusting the position of the block relative to the roller mount base. A compression of the length of the coil spring increases the force applied by the roller pin on the bolt. In contrast, an expansion of the length of the coil spring decreases the force applied by the roller pin on the bolt.

Embodiments of the present invention include coil springs that apply a force of at least about 400 pounds and a total weight for the blowout latch that is less than 1.4 pounds.

One feature of the present invention is that the handle eliminates the need for a separate tool, such as a screw driver, when manually opening the blowout latch. Additionally, the handle provides for ease of opening the blowout latch for maintenance and inspection. Another feature of the present invention is that the handle extends above the aircraft panel when the blowout latch is open. The position of the handle above the aircraft panel advantageously provides an indicator to observers on the ground that the blowout latch is not closed and secured. A further feature of the present invention is that the blowout latch provides at least 400 pounds of force for securing the bolt in the latched position while remaining compact and light, weighing approximately 1.3 pounds.

Other features and advantages of the present invention will be set forth, in part, in the description which follows and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

DETAILED DESCRIPTION OF THE INVENTION

Figure 1:
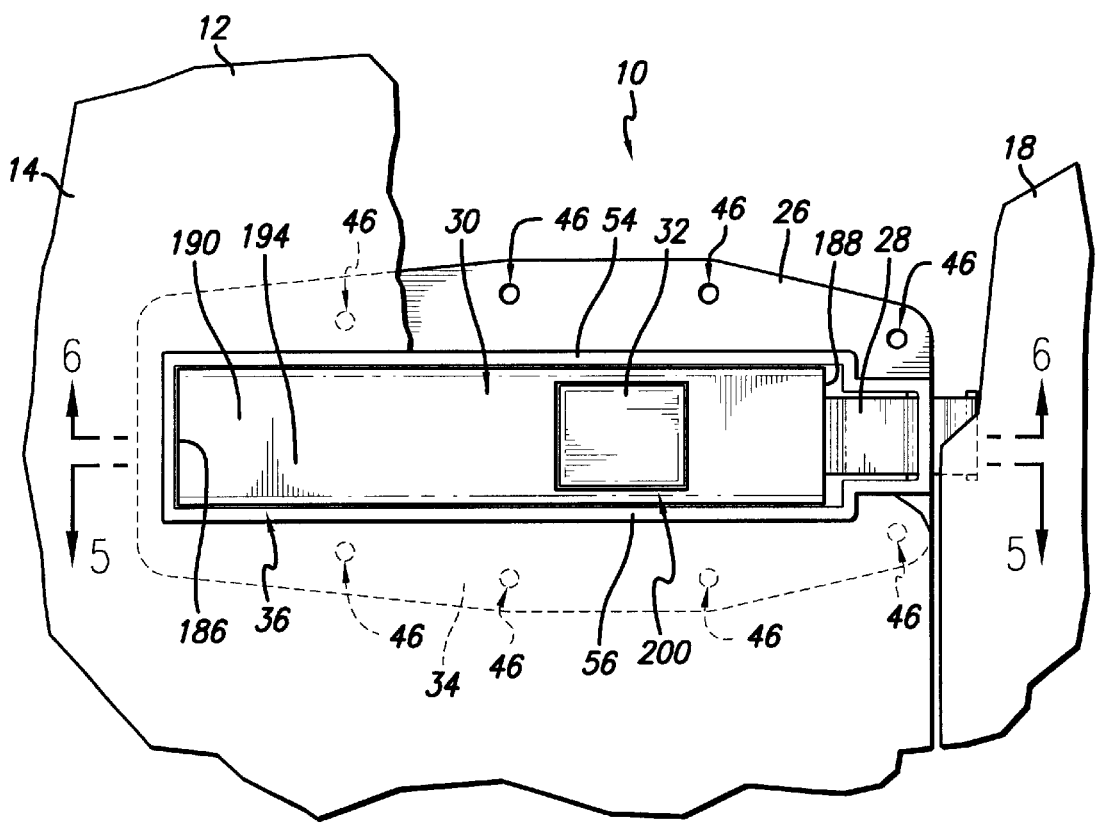
FIG. 1 is a view of a portion of an aircraft panel with a blowout latch.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely a basis for the claims and as a representative basis for teaching one skilled in the art to variously employ the present invention in virtually any appropriately detailed structure.

The inventive blowout latch releasably engages an aircraft structure for securing an aircraft panel to the aircraft structure. As shown in the exemplary drawings, with particular reference to the view of an aircraft panel that includes the inventive blowout latch shown in FIGS. 1 and 4, the invention is embodied in a blowout latch 10 for securing two members, typically an aircraft panel 12, having an exterior surface 14 and an interior surface 16, and an aircraft structure 18, to one another. One or more blowout latches, each weighing less than about 1.4 pounds, are mounted on an aircraft panel for engaging and securing the panel to an adjacent aircraft structure.

Figure 2:
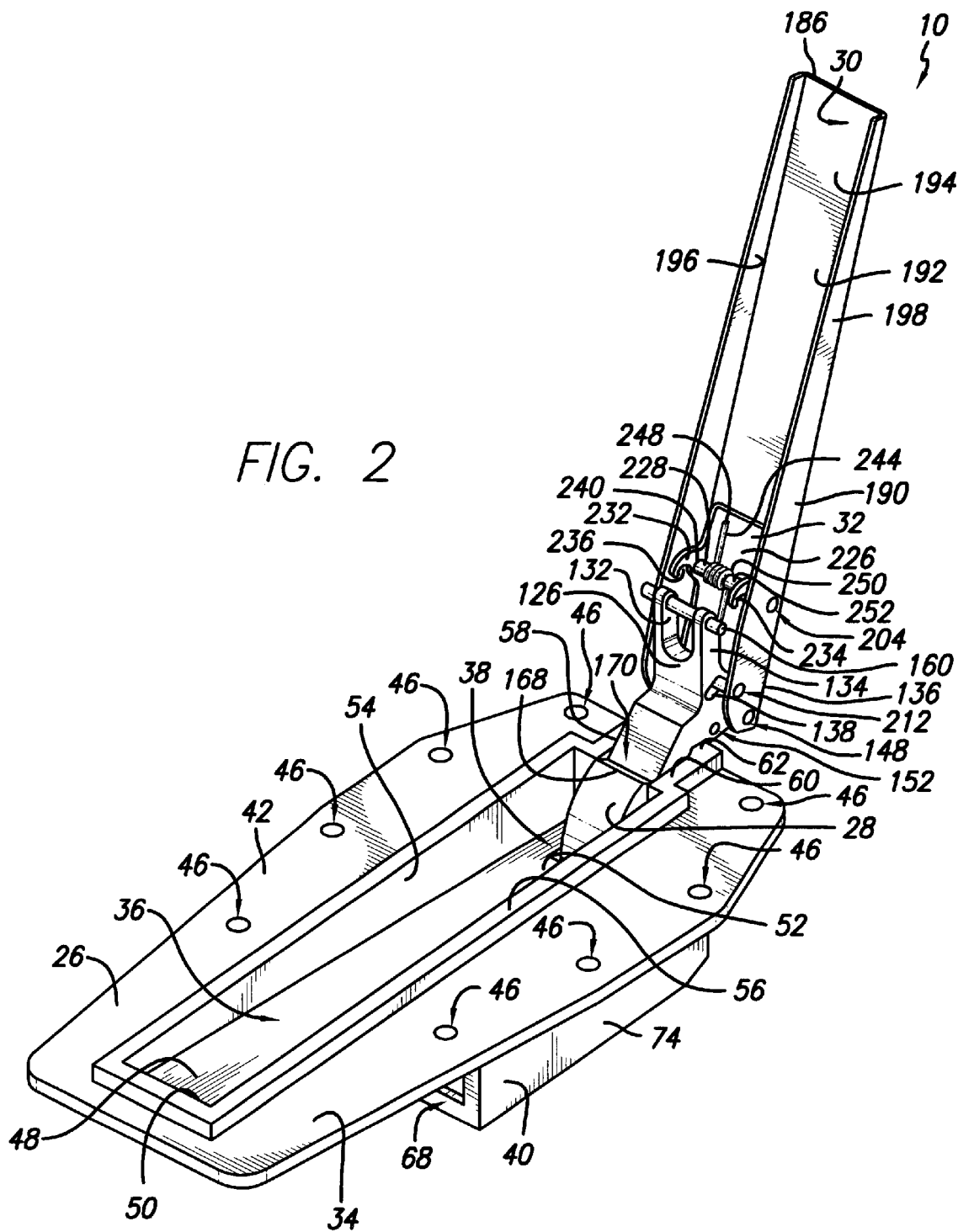
FIG. 2 is a perspective view of the top of a blowout latch in an open position.
Figure 3:
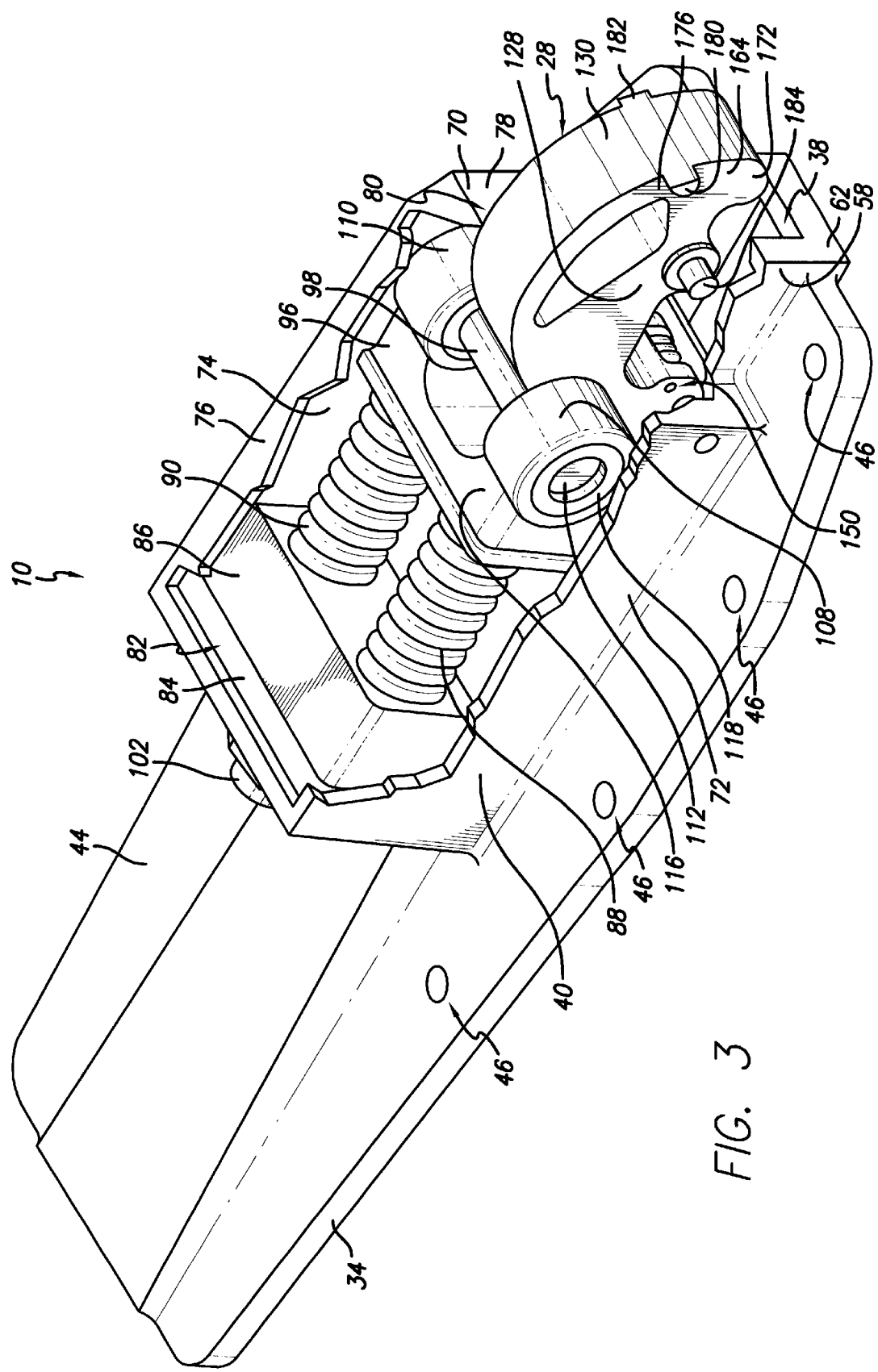
FIG. 3 is a perspective view partially cutaway of the bottom of the blowout latch of FIG. 2 showing the components of a housing.

The blowout latch 10 includes a housing 26, a bolt 28, a handle 30, and a trigger lock 32, all of which are made of stainless steel. Referring additionally to FIGS. 2 and 3, which are top and bottom perspective views of the blowout latch, respectively, the housing includes a faceplate 34, a recessed channel 36, a passageway 38, and a bias section 40. The faceplate includes a top surface 42, a bottom surface 44, and a plurality of mounting holes 46 for receipt of fasteners (not shown) to mount the housing to the aircraft panel 12.

The recessed channel 36 is centrally-positioned along the top surface 42 of the faceplate 34. The recessed channel is comprised of a sloping channel bottom surface 48, which has a channel surface first end 50, a channel surface second end 52, and two channel sidewalls 54 and 56. The channel sidewalls are positioned parallel to one another on opposing sides of the channel bottom surface.

Figure 4:
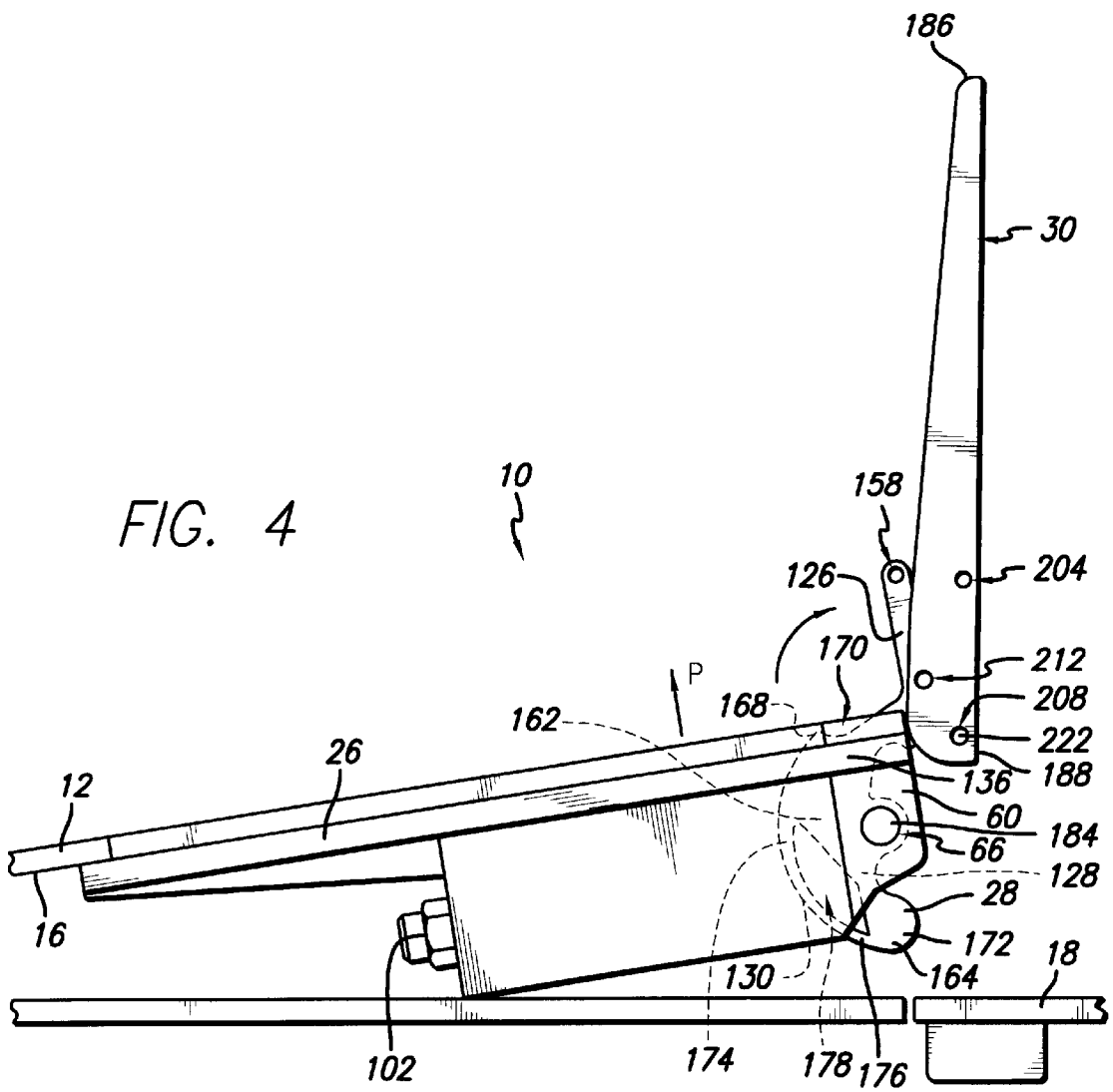
FIG. 4 is a side view of a portion of an aircraft panel with a blowout latch in an open position.

The passageway 38 is defined by the channel surface second end 52, two passageway sidewalls 58 and 60, and a crossbar 62. The two passageway sidewalls are parallel to each 45 other and spaced apart by the channel surface second end and the crossbar. Referring to FIG. 4, a side view of the blowout latch 10 in an open position, both passageway sidewalls, adjacent to the crossbar, have aligned pivot pin interface holes 66 (one shown) formed therethrough.

Returning to FIGS. 2 and 3, the bias section 40 connects to the bottom surface 44 of the faceplate 34. The bias section has an open end 68 and an opposing closed end 70, and a generally rectangular cross-section formed by the bottom surface of the faceplate, two opposing bias section sidewalls 72 and 74, and a bottom wall 76. The closed end includes an end wall 78 with an opening 80 for receipt of the bolt 28. The bottom wall includes a rectangular slot 82 located adjacent the open end.

Figure 5:
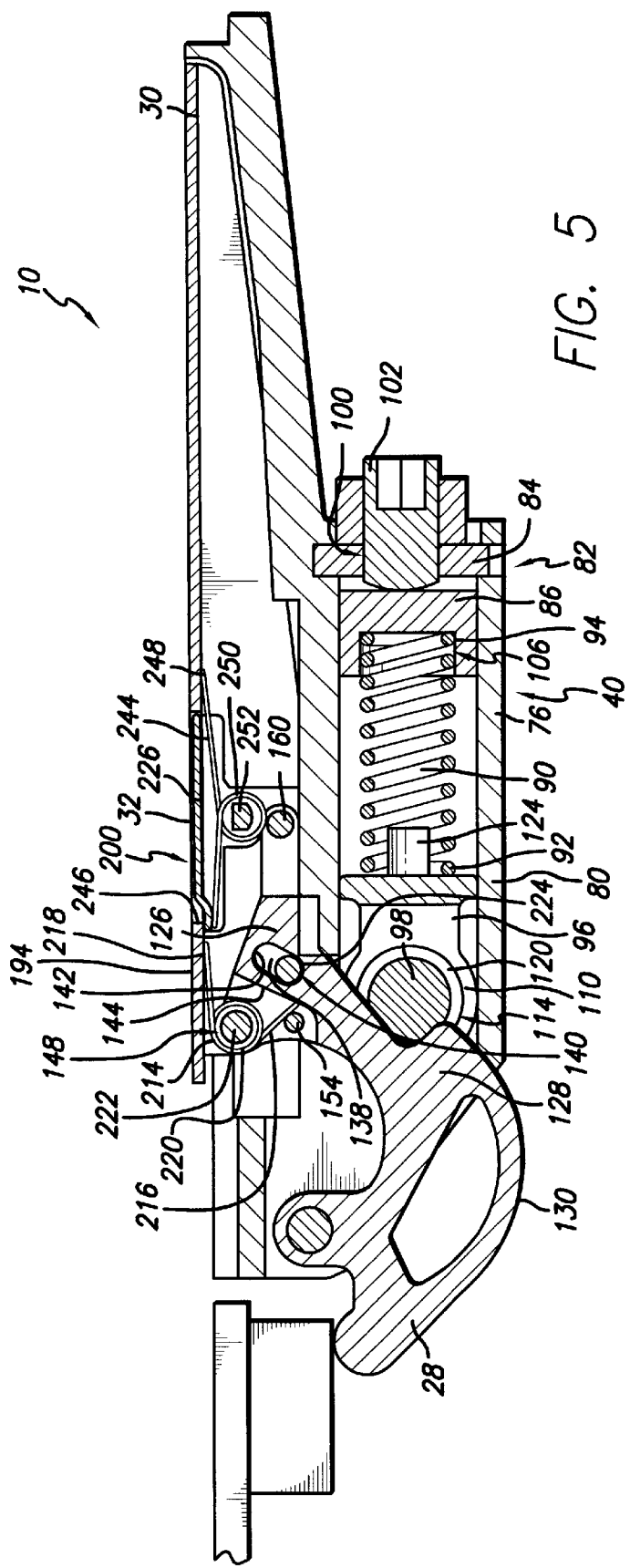
FIG. 5 is a sectional view of FIG. 1 taken along the line 5—5.

Referring additionally to the sectional view of the blowout latch 10 shown in FIG. 5, inside of the bias section 40 is located a plate 84, a block 86, a pair of coil springs 88 and 90, each with opposing ends 92 and 94, a roller mount 96, and a cylindrical roller pin 98. The plate inserts through the rectangular slot 82 in the bottom wall 76 and has a threaded hole 100 through which an adjustment screw 102 is threadably mounted. The adjustment screw contacts the block which is adjacent the plate and interposed between the plate and the pair of coil springs. The block includes a pair of cylindrical cavities 106 (one shown) which open toward the roller mount.

Figure 6:
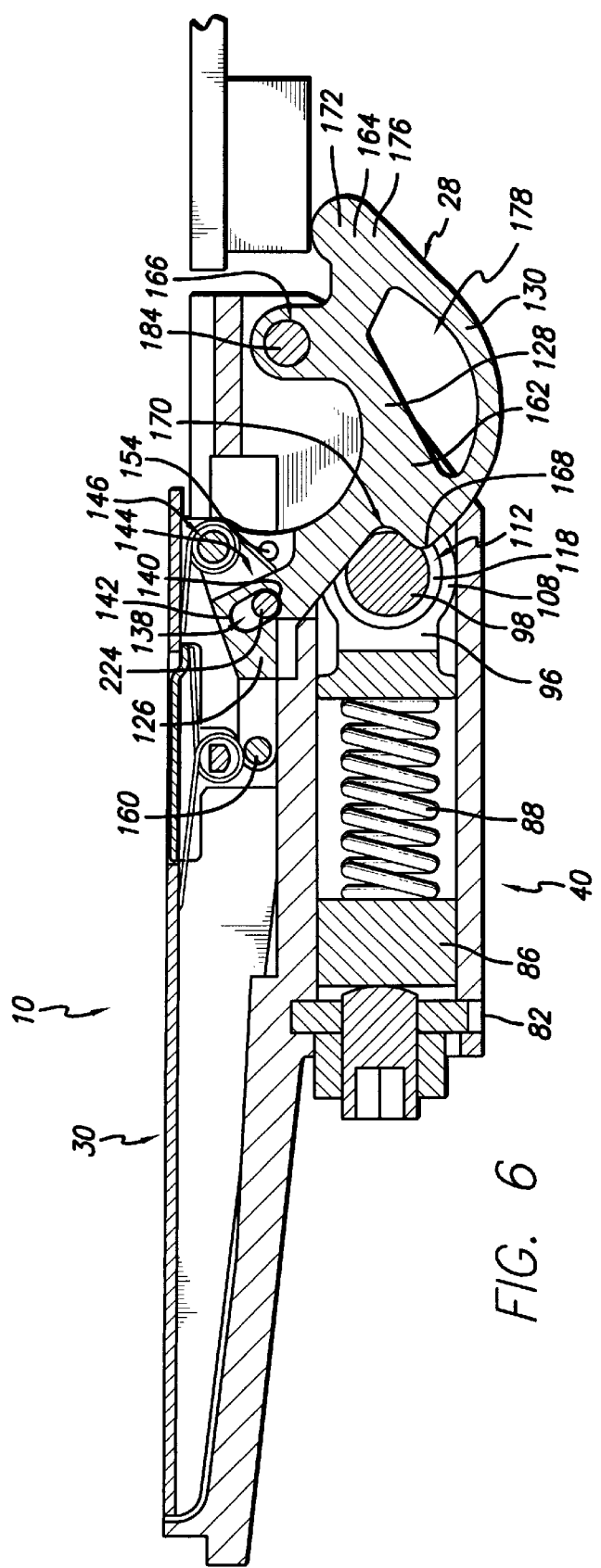
FIG. 6 is a sectional view of FIG. 1 taken along the line 6—6.

Referring additionally to the sectional view of the blowout latch 10 shown in FIG. 6, the roller mount 96 is generally U-shaped and includes two rounded ends 108 and 110, each having a roller pin hole 112 and 114, and a roller mount base 116. The rounded ends are held parallel to one another and spaced apart by the roller mount base. The roller pin holes are aligned with one another and each roller pin hole includes a bearing 118 and 120, respectively. The roller pin 98 is rotatably mounted to the roller mount after insertion of the roller pin through the roller pin holes and bearings. The rounded ends are positioned adjacent the end wall 78. The roller mount base includes two cylindrical fingers 124 (one shown) which extend toward the block 86. One end 94 of the pair of coil springs interfaces with the cylindrical cavities 106 (one shown) in the block while the opposing end 92 of the pair of coil springs interfaces with the cylindrical fingers of the roller mount base.

Referring to FIGS. 2, 3, 4, and 6, the bolt 28 includes an arm 126, a wedge-shaped beam 128, and a curved portion 130. The arm is generally U-shaped and comprised of two arm extensions 132 and 134 spaced apart by an arm base 136 which includes a channel 138, having a channel first end 140 and a channel second end 142, and an indentation 144. The arm has formed therethrough aligned arm base holes 146 and 148 and aligned spring pin holes 150 and 152 adjacent the channel on opposing sides of the indentation. A handle spring pin 154 is inserted through both handle spring pin holes. Each arm extension has formed therethrough an aligned trigger pin hole 158 (one shown). A trigger lock pin 160 is inserted through both trigger pin holes.

The beam 128 has a beam first end 162 and an opposing beam second end 164. A pivot pin hole 166 is interposed between the beam first and second ends. A ridge 168 and a detent notch 170 are located at the beam first end. The beam also includes a rounded extension 172 located at the beam second end.

The curved portion 130 has a curved portion first end 174 and an opposing curved portion second end 176. The arm base 136 and the curved portion first end connect to the beam first end 162. Furthermore, the curved portion second end connects to the beam second end 164, such that a pie-shaped aperture 178 is formed through the bolt 28. The radius of curvature of the bolt decreases the force required for moving from the ridge 168 to the curved portion second end. As best seen in FIG. 3, stops 180 and 182 extend from the bolt below the rounded extension 172 at the point where the curved portion second end and the beam second end meet.

Referring now to FIGS. 2, 3, 4, and 6, the bolt 28 is rotatably mounted to the housing 26 by means of a pivot pin 184 that inserts through both pivot pin interface holes 66 (one shown) in the housing and the pivot pin hole 166 in the bolt. The roller pin 98 contacts the bolt through the opening 80 and the bolt is positioned so as to rotate through the passageway 38. The roller pin, via the pair of coil springs 88 and 90, applies approximately 400 pounds of force on the bolt.

As seen in FIGS. 1, 2, and 4, the blowout latch 10 also includes the handle 30 which has a handle first end 186, a handle second end 188, an exterior surface 190, and an interior surface 192. The handle has a generally U-shaped cross section formed by a handle base plate 194 and a pair of depending handle flanges 196 and 198 that are spaced apart by the handle base plate and are aligned parallel to each other. The handle base plate has a rectangular trigger lock slot 200 formed therethrough.

Each handle flange 196 and 198 has formed therethrough an aligned trigger lock mounting hole 204 (one shown), respectively, positioned adjacent to the trigger lock slot 200. Each handle flange also has formed therethrough an aligned handle mounting hole 208 (one shown) positioned adjacent to the handle second end 188. Adjacent to each of the handle mounting holes, between each handle mounting hole and trigger lock mounting hole, is an aligned bolt pin interface hole 212 (one shown), respectively.

Referring to FIG. 5, the blowout latch 10 includes a handle spring 214 which interfaces with the handle 30 and the bolt 28. The handle spring urges the handle to an unlatched position. The handle spring is comprised of a bolt end 216, a handle end 218, and a handle spring coil 220. The bolt end and the handle end both connect to the handle spring coil.

Referring additionally to FIGS. 2, 4, and 6, the handle 30 is rotatably mounted to the bolt 28 by a handle mounting pin 222 which inserts through both handle mounting holes 208 (one shown), both arm base holes 146 and 148, and the handle spring coil 220. The bolt end 216 of the handle spring 214 interfaces with the bolt and contacts the handle spring pin 154. The handle end 218 contacts the handle base plate 194 between the trigger lock slot 200 and the handle second end 188. A bolt interface pin 224 inserts through both bolt pin interface holes 212 (one shown) and the channel 138.

Referring to FIGS. 2 and 5, the blowout latch 10 includes a trigger lock 32 which is used to open and close the handle 30. The trigger lock is generally U-shaped in cross section, formed by a trigger lock base plate 226, that conforms to the shape of the trigger lock slot 200, and a pair of depending trigger lock flanges 228 (one shown). The trigger lock flanges are positioned parallel to each other and are spaced apart by the trigger lock base plate. The trigger lock flanges terminate in curved forward ends 232 and 234, respectively. The curved forward ends define trigger lock slots 236 (one shown), respectively. Adjacent the curved forward ends, each trigger lock flange has formed therethrough an aligned trigger lock hole 240 (one shown), respectively.

The blowout latch also includes a trigger spring 244 which interfaces with the handle 30 and the trigger lock 32. The trigger spring urges the trigger lock base plate 226 to a position flush relative to the handle base plate 194. The trigger spring is comprised of a trigger lock end 246, a handle interface end 248, and a trigger spring coil 250. The trigger lock end and the handle interface end connect to the trigger spring coil.

The trigger lock 32 is pivotally mounted to the handle 30 by means of a trigger pivot pin 252 that inserts through each trigger lock mounting hole 204 (one shown) of the handle, each trigger lock hole 240 and 242 of the trigger lock, and the trigger spring coil 250. The trigger lock end 246 of the trigger spring 244 contacts the trigger lock base plate 226 adjacent the handle end 218 of the handle spring 214. The handle interface end 248 of the trigger spring contacts the handle base plate 194 between the trigger lock slot 200 and the handle first end 186.

The method of use and operation of the blowout latch 10, constructed as described above, proceeds as follows. It shall be appreciated that FIGS. 1, 2, 3, 4, 5, and 6 illustrate the operation of the blowout latch. With reference to FIGS. 1, 5, and 6, when the blowout latch is properly closed, the handle 30 is in its latched position residing within the recessed channel 36 with the handle base plate 194 relatively parallel to the faceplate 34 of the housing 26. Also, the trigger lock base plate 226 is flush with the handle base plate and the trigger lock pin 160 contacts both trigger lock slots (not shown). Furthermore, the bolt 28 is in its secured position with the bolt interface pin 224 residing within the channel 138 adjacent the channel first end 140 and the roller pin 98 contacting the detent notch 170.

The initial step performed toward manually opening the blowout latch 10 requires that a force be applied to the trigger lock base plate 226 causing the trigger lock 32 to rotate about the trigger pivot pin 252. The rotation of the trigger lock disengages the trigger lock slots 236 from the trigger lock pin 160. The handle end 218 of the handle spring 214 applies a slight upward force against the handle base plate 194 causing the handle 30 to rotate about the handle mounting pin 222 and lift out of the recessed channel 36 and toward an unlatched position. After the force applied to the trigger lock base plate is removed, the trigger spring 244 applies force on the trigger lock base plate causing the trigger lock to rotate about the trigger pivot pin such that the trigger lock base plate is once again flush with the handle base plate.

The force applied by the handle spring 214 on the handle 30 causes the handle to rotate about the handle mounting pin 222 until the bolt interface pin 224 contacts the channel second end 142. At this point, the operator of the blowout latch 10 can grasp the handle and apply further upward force to the handle which causes the bolt 28 to rotate about the pivot pin 184 changing the point of contact of the roller pin 98 on the bolt. As the roller pin shifts from contacting the detent notch 170 to contacting the ridge 168, the roller pin moves toward the block 86 and away from the pivot pin resulting in a compression of the pair of coil springs 88 and 90. The maximum compression of the pair of coil springs, and thus the maximum force applied by the roller pin on the bolt, occurs when the roller pin contacts the ridge.

The force required to rotate the bolt 28 beyond the point where the roller pin 98 contacts the ridge 168 decreases with continued rotation of the bolt due to the decrease in the radius of curvature of the bolt between the ridge and the curved portion second end 176. Referring additionally to FIG. 2, rotation of the bolt about the pivot pin 184 is halted and the blowout latch 10 reaches its fully open position when the bolt contacts the crossbar 62 and the stops 180 and 182 contact the housing 26. When the blowout latch is in its fully open position, the handle 30 is in an unlatched position and the rounded extension 172 is no longer in contact with the aircraft structure 18.

Referring to FIGS. 2, 4, 5, and 6, a similar method of use and operation occurs when the blowout latch 10 is automatically opened due to the build up of pressure on the interior surface 16 of the aircraft panel 12, as shown by the arrow P in FIG. 4. Initially, the upward movement of the aircraft panel is resisted by the force applied by the roller pin 98 upon the detent notch 170 of the bolt 28. As the pressure on the interior surface of the aircraft panel increases, the aircraft panel moves upward and the force of the aircraft structure 18 on the rounded extension 172 of the bolt rotates the bolt about the pivot pin 184. The rotation of the bolt results in the roller pin rolling from the detent notch to the ridge 168 and the compression of the pair of coil springs 88 and 90. When the upward force due to the pressure on the aircraft panel exceeds the downward force applied by the roller pin on the bolt, the roller pin rolls over the ridge and toward the curved portion second end 176.

The rotation of the bolt 28 about the pivot pin 184 causes the handle first end 186 to rise out of the recessed channel 36 and extend above the faceplate 34. However, the bolt interface pin 224 continues to be adjacent the channel first end 140 since the trigger lock 32 secures the handle 30 to the bolt due to the contact between the trigger lock pin 160 and the trigger lock slots 236 (one shown). Referring additionally to FIG. 3, rotation of the bolt about the pivot pin halts once the bolt contacts the crossbar 62 and the stops 180 and 182 contact the housing 26.

The process by which the blowout latch 10 is closed depends upon whether the blowout latch was opened manually or automatically. If the blowout latch was opened manually, force is applied to the handle 30 which counteracts the force applied by the handle spring 214 and rotates the handle about the handle mounting pin 222 toward the housing 26. The rotation of the handle moves the bolt interface pin 224 from the channel second end 142 to the channel first end 140. As the handle rotates about the handle mounting pin, the curved forward ends 232 and 234 of the trigger lock ride against the trigger lock pin 160 causing the trigger lock to rotate about the trigger pivot pin 252 until, with continued force, the trigger lock pin contacts the trigger lock slots 236 (one shown), thus, securing the handle to the bolt 28.

From this point forward, the process by which the blowout latch 10 closes is the same regardless of the blowout latch being opened manually or automatically. Further application of downward force on the handle 30 causes the bolt 28 to rotate about the pivot pin 184. Increasing force must be applied to the handle, as it is pushed toward its latched position, since the pair of coil springs 88 and 90 compress as the radius of curvature of the bolt, at the point where the roller pin 98 contacts the bolt, increases. Eventually, the roller pin rolls over the ridge 168 and contacts the detent notch 170, at which point, the bolt is in its secured position, the handle is in its latched position residing within the recessed channel 36, the rounded extension 172 contact the aircraft structure 18, and the blowout latch is closed. The force from the pair of coil springs biases the bolt to remain in its secured position.

A feature of the blowout latch 10 is that the amount of force applied by the roller pin 98 on the bolt 28 is selectable by rotation of the adjustment screw 102. As the adjustment screw is rotated, the position of the block 86 relative to the plate 84 varies as does the position of the block relative to the roller mount 96 and roller pin. Modifying the distance between the block and roller mount results in a corresponding compression or expansion of the length of the pair of coil springs 88 and 90. The force applied by the roller pin on the bolt increases as the length of the pair of coil springs compress and decrease as the pair of coil springs expand.

Another feature of the blowout latch 10 is that it includes a handle 30 and thus eliminates the need for a separate tool to manually release the latch. Thus, the handle provides for ease in manually opening the blowout latch for maintenance and inspection.

A further feature of the blowout latch 10 is that the handle 30 provides an indicator that the latch is in an open position which is visible from the ground. Additionally, the blowout latch can indicate whether the latch was opened manually or automatically since the handle remains secured to the bolt 28 by the trigger lock 32 interface with the trigger lock pin 160 when the latch is automatically opened. In contrast, when the latch is opened manually, the trigger lock 32 is not in contact with the trigger lock pin.

Another feature of the blowout latch 10 is that when the latch is manually opened, the handle 30 is designed to be initially rotated out of the recessed channel 36 by the force applied by the handle spring 214 on the handle. This allows the handle to be rotated to the point that an operator can easily insert their fingers between the handle and the top surface 42 of the faceplate 34 and grasp the handle. Therefore, the blowout latch is designed for ease in operation. Additional features of the blowout latch are that it provides at least about 400 pounds of force for securing the bolt 28 and blowout latch weighs less than about 1.4 pounds.

Those skilled in the art will recognize that other modifications and variations can be made in the blowout latch of the invention and in the construction and operation of the blowout latch without departing from the scope or spirit of this invention. For example, it should be understood that this device could also be used to secure a variety of different panels to various types of structures. With such possibilities in mind, the invention is defined with reference to the following claims.

I claim:

1. A blowout latch for releasably securing an aircraft panel to an aircraft structure, the blowout latch comprising:
   a housing having a bias section, the bias section including:
      a plate;
      a block positioned adjacent to the plate;
      at least one coil spring having opposing ends;
      a roller mount having a roller mount base, one end of the coil spring contacting the roller mount base, the opposing end of the coil spring contacting the block; and
      a roller pin rotatably mounted to the roller mount;
   a bolt rotatably mounted to the housing for engaging the aircraft structure, the bolt having a secured position, the bolt held in its secured position by the coil spring biasing the roller pin against the bolt; and
   a handle rotatably mounted to the bolt and moveable between a latched position and an unlatched position, without the use of a tool, the handle providing an indicator when the blowout latch is in an open position.

2. The blowout latch of claim 1, further comprising a handle spring interfacing with the handle and the bolt and urging the handle toward the unlatched position.

3. The blowout latch of claim 1, wherein the handle is secured to the bolt by a trigger lock pivotally mounted to the handle.

4. The blowout latch of claim 3, wherein the handle includes a handle base plate and a trigger spring, the trigger spring interfacing the trigger lock and the handle and urging the trigger lock toward a flush position relative to the handle base plate.

5. The blowout latch of claim 1, wherein the housing further includes a faceplate having a recessed channel, the recessed channel receiving the handle when the handle is in its latched position.

6. The blowout latch of claim 1, further comprising an adjustment screw threadably mounted through the plate, the adjustment screw for varying the length of the coil spring by adjusting the position of the block relative to the roller mount base, a compression of the length of the coil spring increasing the force applied by the roller pin on the bolt, an expansion of the length of the coil spring decreasing the force applied by the roller pin on the bolt.

7. The blowout latch of claim 1, wherein the bolt has a detent notch, the roller pin contacting the detent notch when the bolt is in its secured position.

8. The blowout latch of claim 1, wherein the coil spring applies a biasing force of at least about 400 pounds.

9. The blowout latch of claim 8, wherein the blowout latch weighs less than about 1.4 pounds.

10. A blowout latch for releasably securing an aircraft panel to an aircraft structure, the blowout latch comprising:
   a housing having a bias section, the bias, section including:
      a plate;
      a block positioned adjacent to the plate;
      at least one coil spring having opposing ends;
      a roller mount having a roller mount base, one end of the coil spring contacting the roller mount base, the opposing end of the coil spring contacting the block; and
      a roller pin rotatably mounted to the roller mount;
   a bolt rotatably mounted to the housing for engaging the aircraft structure, the bolt having a secured position, the bolt held in its secured position by the coil spring biasing the roller pin against the bolt;
   a handle that includes, a handle base plate, the handle is rotatably mounted to the bolt and is moveable between a latched position and an unlatched position, without the use of a tool, the handle providing an indicator when the blowout latch is in an open position;
   a handle spring interfacing with the handle and the bolt and urging the handle toward the unlatched position;
   a trigger lock pivotally mounted to the handle for securing the handle to the bolt; and
   a trigger spring interfacing the trigger lock and the handle and urging the trigger lock toward a flush position relative to the handle base plate.

11. The blowout latch of claim 10, wherein the housing further includes a faceplate having a recessed channel, the recessed channel receiving the handle when the handle is in its latched position.

12. The blowout latch of claim 10, further comprising an adjustment screw threadably mounted through the plate, the adjustment screw for varying the length of the coil spring by adjusting the position of the block relative to the roller mount base, a compression of the length of the coil spring increasing the force applied by the roller pin on the bolt, an expansion of the length of the coil spring decreasing the force applied by the roller pin on the bolt.

13. The blowout latch of claim 10, wherein the bolt has a detent notch, the roller pin contacting the detent notch when the bolt is in its secured position.

14. The blowout latch of claim 10, wherein the coil spring applies a biasing force of at least about 400 pounds.

15. The blowout latch of claim 14, wherein the blowout latch weighs less than about 1.4 pounds.

16. A blowout latch for releasably securing an aircraft panel to an aircraft structure, the blowout latch comprising:
   a housing including:
      a faceplate having a recessed channel; and
      a bias section including:
         a plate;
         a block positioned adjacent to the plate;
         at least one coil spring having opposing ends;
         a roller mount having a roller mount base, one end of the coil spring contacting the roller mount base, the opposing end of the coil spring contacting the block;
         a roller pin rotatably mounted to the roller mount; and
         an adjustment screw threadably mounted through the plate, the adjustment screw for varying the length of the coil spring by adjusting the position of the block relative to the roller mount base;
   a bolt having a detent notch and a secured position, the bolt rotatably mounted to the housing for engaging the aircraft structure, the roller pin contacting the detent notch when the bolt is in its secured position, the bolt held in its secured position by the coil spring biasing the roller pin against the bolt;
   a handle that includes a handle base plate, the handle is rotatably mounted to the bolt and is moveable between a latched position where the handle resides within the recessed channel and an unlatched position, without the use of a tool, the handle providing an indicator when the blowout latch is in an open position;
   a handle spring interfacing with the handle and the bolt and urging the handle toward the unlatched position;
   a trigger lock pivotally mounted to the handle for securing the handle to the bolt; and
   a trigger spring interfacing the trigger lock and the handle and urging the trigger lock toward a flush position relative to the handle base plate.

17. A blowout latch for releasably securing an aircraft panel to an aircraft structure, the blowout latch comprising:
   a housing;
   a bolt moveably attached to the housing;
   the bolt being moveable between a latched and unlatched positions;
   a handle moveably attached to the bolt;
   the handle being moveable between a latched and unlatched positions;
   a bias section carried on the housing and imposing a force on the bolt; and
   a trigger carried on the handle and selectively engageable with the bolt to manually open the latch, wherein the trigger is pivotally attached to the handle, the trigger remaining engaged with bolt when the latch is automatically opened and the trigger disengaging the bolt when the latch is manually opened.

18. The blowout latch of claim 17, wherein the trigger holds the handle in a closed position when the trigger is engaged with the bolt.

19. The blowout latch of claim 17, wherein engagement of the trigger with bolt when the latch is in an open position provides an indication of the blowout latch being opened automatically and disengagement of the trigger from bolt when the latch is in an open position provides an indication of the blowout latch being manually opened.

20. A blowout latch for releasably securing an aircraft panel to an aircraft structure, the blowout latch comprising:
   a housing;
   a bolt moveably attached to the housing;
   the bolt being moveable between a latched and unlatched positions, the bolt defining a channel;

a handle moveably attached to the bolt;

the handle being moveable between a latched and unlatched positions;

a bias section carried on the housing and imposing a force on the bolt;

a trigger carried on the handle and selectively engageable with the bolt to manually open the latch; and a bolt interface pin carried on the handle and extending into the channel, the pin being displaceable in the channel when the handle moves between the latched and unlatched positions.

21. A blowout latch for releasably securing an aircraft panel to an aircraft structure, the blowout latch comprising:

a housing;

a bolt moveably attached to the housing;

the bolt being moveable between a latched and unlatched positions;

a handle moveably attached to the bolt;

the handle being moveable between a latched and unlatched positions;

a trigger carried on the handle and selectively engageable with the bolt to manually open the latch; and a bias section carried on the housing and imposing a force on the bolt, the bias section including:

a roller mount moveably retained in the housing;

a roller pin carried on the roller mount;

at least a pair of springs, one end of the springs abutting the roller mount;

a block abutting a second end of the springs opposite the first end of the springs; and an adjuster carried on the housing and abutting the block for selectively adjusting the spring force of the springs on the roller mount.

22. A blowout latch for releasably latching an aircraft panel to an aircraft structure, the blowout latch comprising:

a housing;

a bolt moveably attached to the housing;

the bolt being moveable between a latched and unlatched position with the aircraft structure;

a handle moveably attached to the bolt;

the handle being moveable between a latched and unlatched positions;

a bias section carried on the housing and imposing a force on the bolt;

the bias section retaining the bolt in a latched position;

a trigger carried on the handle and selectively engageable with the bolt to manually open the latch;

the bolt includes a channel, a bolt interface pin carried on the handle and extending into the channel, the pin being displaceable in the channel when the handle moves between the latched and unlatched positions;

the handle moving the bolt coupled thereto, when the trigger is disengaged from the bolt, against the force of the bias section to unlatch the bolt from the aircraft structure.

\* \* \* \* \*